(12) United States Patent
Mohamed

(10) Patent No.: US 6,366,998 B1
(45) Date of Patent: *Apr. 2, 2002

(54) RECONFIGURABLE FUNCTIONAL UNITS FOR IMPLEMENTING A HYBRID VLIW-SIMD PROGRAMMING MODEL

(75) Inventor: Moataz A. Mohamed, Irvine, CA (US)

(73) Assignee: Conexant Systems, Inc., Newport Beach, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/172,315

(22) Filed: Oct. 14, 1998

(51) Int. Cl.[7] .................................................. G06F 9/38
(52) U.S. Cl. ............................. 712/17; 712/20; 712/24; 712/222
(58) Field of Search ......................... 712/24, 22, 23, 712/17, 7, 222, 20

(56) References Cited

U.S. PATENT DOCUMENTS

| | | | | |
|---|---|---|---|---|
| 4,434,459 A | | 2/1984 | Holland et al. .............. 364/200 |
| 4,514,803 A | * | 4/1985 | Agnew et al. ................ 395/500 |
| 4,992,934 A | | 2/1991 | Portanova et al. ........... 364/200 |
| 5,077,659 A | | 12/1991 | Nagata ........................ 395/375 |
| 5,212,777 A | | 5/1993 | Gove et al. .................. 395/375 |
| 5,269,007 A | | 12/1993 | Hanawa et al. .............. 395/375 |
| 5,420,992 A | | 5/1995 | Killian et al. ................ 395/375 |
| 5,502,826 A | * | 3/1996 | Vassiliadis et al. .......... 712/213 |
| 5,509,129 A | | 4/1996 | Guttag et al. ................ 395/375 |
| 5,517,628 A | * | 5/1996 | Morrison et al. ............ 712/234 |
| 5,530,881 A | | 6/1996 | Inagami et al. ................. 712/7 |
| 5,598,546 A | | 1/1997 | Blomgren .................... 395/385 |
| 5,625,784 A | | 4/1997 | Purcell ........................ 395/386 |
| 5,625,838 A | | 4/1997 | Caudel et al. ............... 395/800 |
| 5,649,135 A | | 7/1997 | Pechanek et al. ............ 395/396 |
| 5,673,407 A | | 9/1997 | Poland et al. ................ 395/375 |
| 5,680,632 A | | 10/1997 | Studor et al. ................ 395/800 |
| 5,685,009 A | | 11/1997 | Blomgren et al. ........... 395/800 |
| 5,822,606 A | * | 10/1998 | Morton ......................... 712/16 |
| 6,101,592 A | * | 8/2000 | Pechanek et al. .............. 712/20 |

FOREIGN PATENT DOCUMENTS

| | | | | |
|---|---|---|---|---|
| EP | 0 426 393 A2 | 5/1991 | ............. G06F/9/30 |
| EP | 0 454 985 A2 | 11/1991 | ............. G06F/9/38 |
| EP | 0 681 236 A1 | 11/1995 | ........... G06F/9/302 |

OTHER PUBLICATIONS

E. Mirsky, A. DeHon, *A Reconfigurable Computing Architecture with Configurable Instruction Distribution and Deployable Resources*, Jul., 1996.

Press Release: *LSI Logic announces availability of the first synthesizable ARM7 Thumb core for communications applications*, Sep. 8, 1997.

* cited by examiner

*Primary Examiner*—Richard L. Ellis
*Assistant Examiner*—Gautam R. Patel
(74) *Attorney, Agent, or Firm*—Michael J. Donohue; Seed IP Law Group PLLC

(57) ABSTRACT

The present invention generally relates to a hybrid VLIW-SIMD programming model for a digital signal processor. The hybrid programming model broadcasts a packet of information to a plurality of functional units or processing elements. Each packet contains several instructions having certain characteristics, such as instruction type and instruction length, among others. The hybrid programming model includes functional units which are reconfigurable based upon the instructions with an instruction packet and the availability of the functional units. The model groups the functional units such that the operations specified in the instructions can be efficiently executed and selects which functional units should be utilized for a given operation.

19 Claims, 11 Drawing Sheets

Fig. 11

RECONFIGURABLE FUNCTIONAL UNITS FOR IMPLEMENTING A HYBRID VLIW-SIMD PROGRAMMING MODEL

TECHNICAL FIELD OF THE INVENTION

The present invention relates generally to digital signal processors. In particular, the present invention relates to a programming model for a high performance digital signal processor which has multiple reconfigurable functional units for executing instructions.

BACKGROUND OF THE INVENTION

Many different types of programming models exist in the area of digital signal processing. In general, these models differ by their characteristics, such as data types, data lengths, data functions and the like. Instruction parallelism models are one type of model. An instruction parallelism model is defined by its ability to simultaneously execute different instructions. Instruction parallelism models can be embodied by a very long instruction word ("VLIW") model or a super-scalar model, among others. VLIW models use a horizontal approach to parallelism where several scalar instructions are included in a long instruction word that is fetched and executed every cycle. More specifically, in each cycle, an instruction word specifies operations to be performed using specific operands. Exemplary operations may include mathematical operations, logical operations, and the like, depending upon the needs of a particular application. Functional units which perform the operations may include any type of processing elements, such as, for example, execution units. More specifically, exemplary functional units may include multiply-accumulate ("MAC") units, load/store units, add units, etc. and may vary from application to application.

Instructions are processed by a scheduler which determines which functional units should be used for executing each instruction. Scheduling may be done statically, i.e., at compile time, as opposed to dynamically, i.e., at run time. Thus, VLIW models can simultaneously execute instructions while minimizing the occurrence of hazards. Because of this feature, among others, instruction parallelism models are very efficient in telecommunications applications.

Developing an instruction set architecture based on a VLIW model has several advantages. First, VLIW models are very scalable, both upward and downward. Scalability refers to the number of operations that can be packed into one long instruction word. The scalability enables the model to serve as a basis for a family of derivative implementations for various high performance digital signal processor ("DSP") and multimedia applications. Second, "memory walls" are not an issue in the VLIW model. Memory walls refer to the concept that processor speeds are increasing at a rate more quickly than memory speeds. In the case of a VLIW model, memory walls are not a concern because the processor is simultaneously executing a large number of instructions instead of executing one complex instruction in a consecutive order where a processor would have to repeatedly wait for information from memory for every consecutive instruction. Third, the VLIW model saves silicon area and power by off loading the complex instruction scheduling scheme to the compiler.

Data parallelism models are a second type of model. A data parallelism model, also known as a vector model, is defined by its ability to simultaneously execute multiple operations of a single instruction, where each operation can be performed with different data. A data parallelism model uses vector instructions specifying vector operations and is embodied in a single instruction multiple data ("SIMD") model. Data parallelism models are very efficient in block based applications such as image processing, Motion Pictures Experts Group ("MPEG") systems, Finite Duration Impulse Response ("FIR") systems, video conferencing, filtering applications, and multimedia applications.

As noted above, the instruction parallelism models and the data parallelism models are efficient for different types of applications. It would be extremely advantageous to develop a programming model with an instruction set architecture ("ISA") which incorporates the advantages of both the instruction parallelism and data parallelism models on which many different types of applications may run. More specifically, it would be advantageous to develop an instruction set architecture which permits the incorporation of a vertical programming model, such as a SIMD model, into a horizontal programming model, such as a VLIW model.

Many current programming models, regardless of whether they are horizontal or vertical models, do not provide for efficient code density. That is, current programming models use more memory than necessary in enabling the performance of certain functions. Programming models typically specify fixed-length instruction sets. For example, current standard reduced instruction set computer ("RISC") processes normally employ fixed-length 32-bit instruction sets. A problem arises when a function can be performed with instructions having fewer than the fixed number of bits. In this case, the function must be carried out according to the programming model specifications and additional memory is used that is not necessary to perform the function. For example, assume a programming model provides for a 32-bit instruction set and a programmer desires to retrieve two numbers from memory and add them. Assume further that because of the size of the numbers and the operation, this function can be carried out using 16-bit instructions. Because of the specifications of the programming model, this function uses 3 operations×32 bits or 96 bits. However, to perform the function outside the limitations of the programming model, this function only requires 3 operations×16 bits or 48 bits. Thus, current programming models unnecessarily require the use of additional memory and do not take advantage of code density. In addition to having better code density, a DSP which facilitates using only 48 bits for the above example would also use less power in executing the operation due to the reduction in the power associated with fetching a smaller number of instructions (and hence smaller number of bits).

Some programming models include 16-bit instruction sets which are expanded into 32-bit instruction sets when executed. A DSP which takes a 16-bit instruction from memory and dynamically expands it to a 32-bit instruction at run time before sending it to the execution unit has equivalent code density to our scheme, however it suffers from two disadvantages. First, it has to spend extra decode time in order to expand the fetched 16-bit instruction into a native 32-bit instruction. This typically would cost an extra pipeline stage which has several adverse performance implications. Second, this dynamic expansion at run time typically would consume significant power.

Other programming models that currently adopt a variable length instruction set do so at the cost of certain disadvantages. Specifically, such programming models include hardware decoder logic that is extremely complex, thus requiring a longer decoding time.

SUMMARY OF THE INVENTION

Accordingly, the present invention overcomes problems in the prior art by providing an instruction set architecture for a digital signal processor that has improved code density, improved instruction level parallelism and improved issue bandwidth. The instruction set architecture includes information packets which may include instructions having different characteristics, such as instruction type (for example, scalar or vector) and instruction length (for example, 16-bit and 32-bit). These instructions are received by a scheduler or scoreboard unit which then determines the functional units that are available for executing the instructions. The instructions are then broadcast to a plurality of function units or processing elements for execution.

BRIEF DESCRIPTION OF THE DRAWING

A more complete understanding of the present invention may be derived by referring to the detailed description and claims when considered in connection with the Figures, wherein like reference numbers refer to like items throughout the Figures, and:

Figure 11:
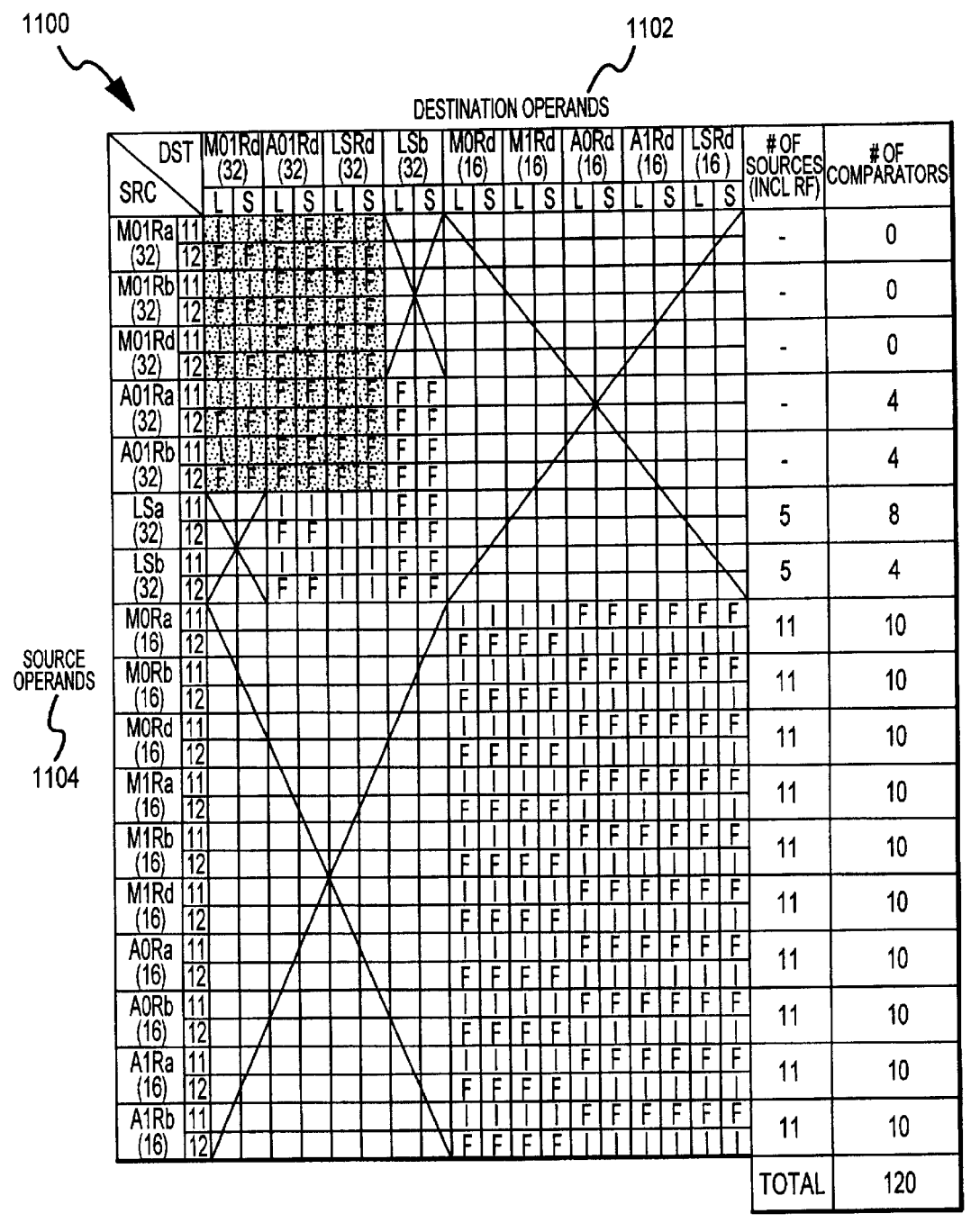

FIG. 11 is a schematic representation of an exemplary scheduler.

DETAILED DESCRIPTION OF THE PREFERRED EMBODIMENTS

The present invention provides a hybrid VLIW-SIMD programming model for use with a digital signal processor ("DSP"). The hybrid VLIW-SIMD programming model of the present invention is designed to facilitate efficient mapping of various telecommunication, multimedia, and DSP algorithms. The programming model is based on the concept that if multiple functional units are available, they can be configured such that they deliver both horizontal parallelism, e.g., under a VLIW programming model, vertical parallelism, e.g., under a SIMD programming model, or a combination thereof, i.e., a hybrid programming model. This model is extremely flexible in that it permits both SIMD vectorizable block-based multimedia applications as well as VLIW non-vectorizable modem and telecommunication applications.

The following U.S. Patent Applications are related to the present invention. More specifically, these U.S. Patent Applications detail, inter alia, exemplary arrangements of processing elements such as functional units and register files for achieving efficient execution of operations while balancing time, cost and spacial concerns. Therefore, the following U.S. Patent Applications are hereby incorporated by reference: Efficient Forwarding Paths and Operand Sharing in a Digital Signal Processor, by inventors Moataz A. Mohamed, John R. Spence, and Kenneth W. Malich, Ser. No. 09/173,257, and Multiplier-Accumulator Coupling in a Digital Signal Processor, by inventor Moataz A. Mohamed, Ser. No. 09/172,527.

The present invention may be described herein in terms of functional block components and various processing steps. It should be appreciated that such functional blocks may be realized by any number of components configured to perform specified functions. For example, the present invention may employ various integrated circuit components, which may carry out a variety of functions. In addition, those skilled in the art will appreciate that the present invention may be practiced in any number of data processing contexts and that the DSP configuration described herein is merely one exemplary application for the invention. Further, it should be noted that the present invention may employ any number of conventional techniques for data storage, transport, manipulation, processing, and the like. Such general techniques that may be known to those skilled in the art are not described in detail herein.

Figure 1:
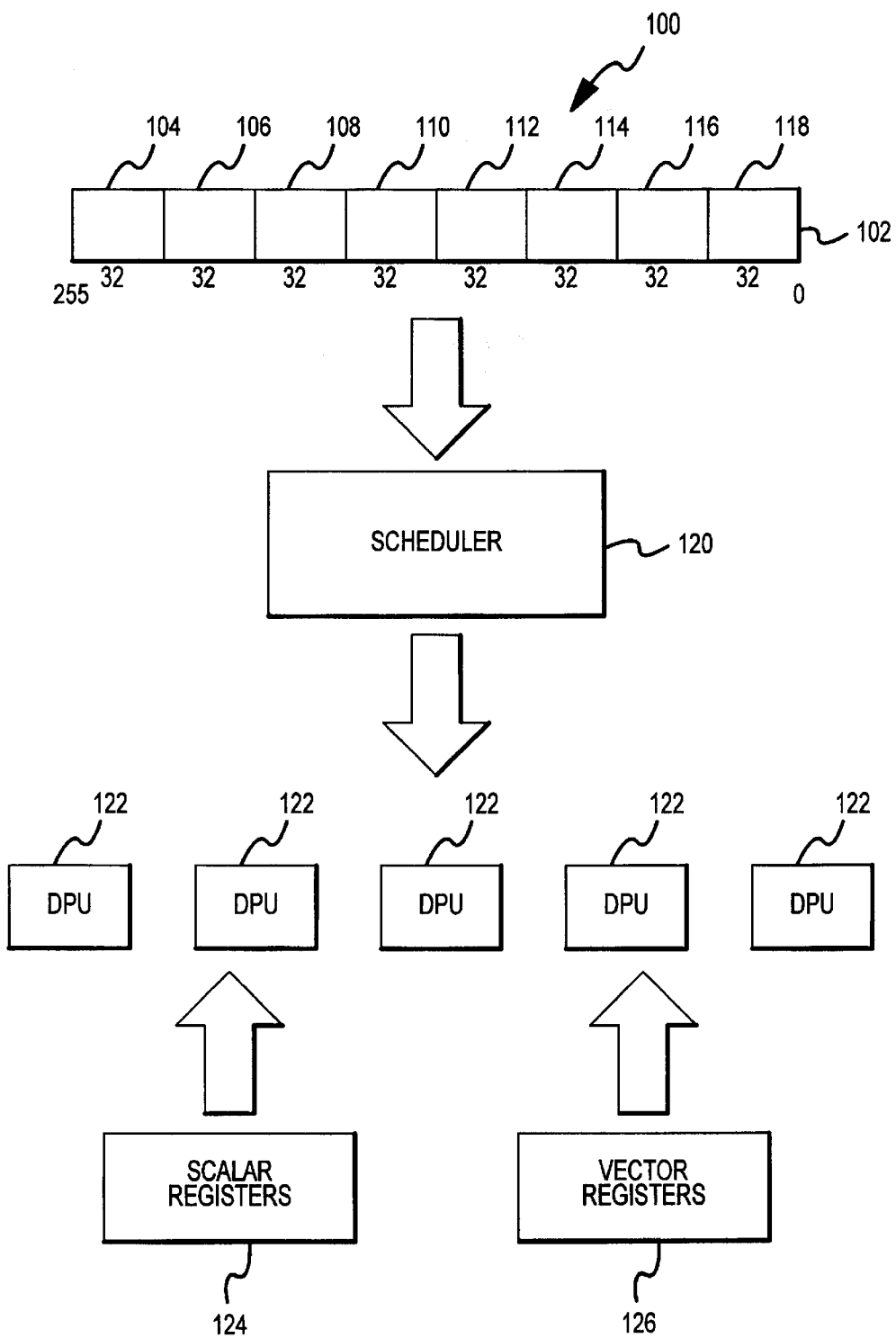
FIG. 1 is a partial schematic representation and partial block diagram of an exemplary hybrid VLIW-SIMD model digital signal processor.

With reference to FIG. 1, an exemplary hybrid VLIW-SIMD DSP 100 executes a number of 256-bit instruction packets 102 (one shown in FIG. 1) which include, among other things, a number of instructions 104–116, and a header or template field 118. Instructions 104–116 specify operations to be performed on specified operands and may be of varying characteristics, such as instruction length and instruction type. Instructions 104–116 within instruction packet 102 may be of different lengths, for example, all 16 bits long, all 32 bits long, or a combination of lengths. The length characteristics of instructions 104–116 may be identified in template field 118. In addition, instructions 104–116 may be of different types, for example, all scalar instructions, all vector instructions or some combination of instructions types. It should be appreciated that the above bit lengths, characteristics, instruction types and instruction lengths are exemplary and shall not be so limited. These exemplary characteristics may extend to include other characteristics currently known or those that may be utilized in the future.

Instructions 104–116 of the hybrid VLIW-SJMD DSP 100 are preferably received by a scheduler or scoreboard unit 120 which then determines which functional units are available for executing the instructions. Instructions 104–116 are then broadcast data path units ("DPUs") 122, each of which typically includes a plurality of functional units or processing elements. An exemplary DSP 100 preferably includes five DPUs 122. The functional units or processing elements included within DPUs 122 execute instructions 104–116 utilizing data element or operands from a scalar register file 124 and a vector register file 126.

The functional units within DPUs 122 may be dynamically reconfigured to execute the variety of operations that may be required by instructions 104–116. That is, in one cycle, one add unit may be used in connection with another add unit to execute a 64-bit vector add function. However, in another cycle, the same add unit may also be used to execute a 16-bit scalar operation.

Put another way, if a programmer desires to develop a program using only the horizontal instruction types to satisfy an entirely scalar application, he would be able to take advantage of the multiple functional units because there would be no vectorizable instructions utilizing the functional units. That is, each instruction in a VLIW instruction packet can simultaneously utilize different functional units in a more time-efficient manner. As here, when a program only uses a VLIW mode and does not contain any vectorizable instructions, it is referred to as horizontal parallelism.

Similarly, if a programmer desires to develop a program using vector (SIMD) instructions to satisfy vectorizable applications, he may be able to use multiple functional units combined to execute the instruction. For example, a vector addition instruction "VADD" performed on two vectors of 64-bits each uses two adder units combined together to perform the vector add operation. This vector execution model is referred to vertical parallelism because it is one instruction performed on multiple data elements.

In some circumstances, especially if maximum efficient performance is desired, the hybrid VLIW-SIMD model may be exploited to get both horizontal and vertical parallelism. For instance consider the case, where a VLIW packet contains the above VADD in parallel with a scalar load, a scalar multiply and a vector subtract. In this exemplary situation, we have exploited the hybrid model and taken advantage of both the horizontal parallelism (represented by scalar instructions within a VLIW packet) and the vertical parallelism (represented by vector instructions that perform the same operation on several elements). The above situation is depicted by the following instruction, where "||" means in parallel with.

VADD||LOAD||SMULT||VSUB . . . |

The above combination utilizes the hybrid model feature. Functional units would be used as necessary, i.e., either to handle scalar operations or vector operations, to execute the scalar and vector instructions illustrated in the hybrid instruction.

Figure 2:
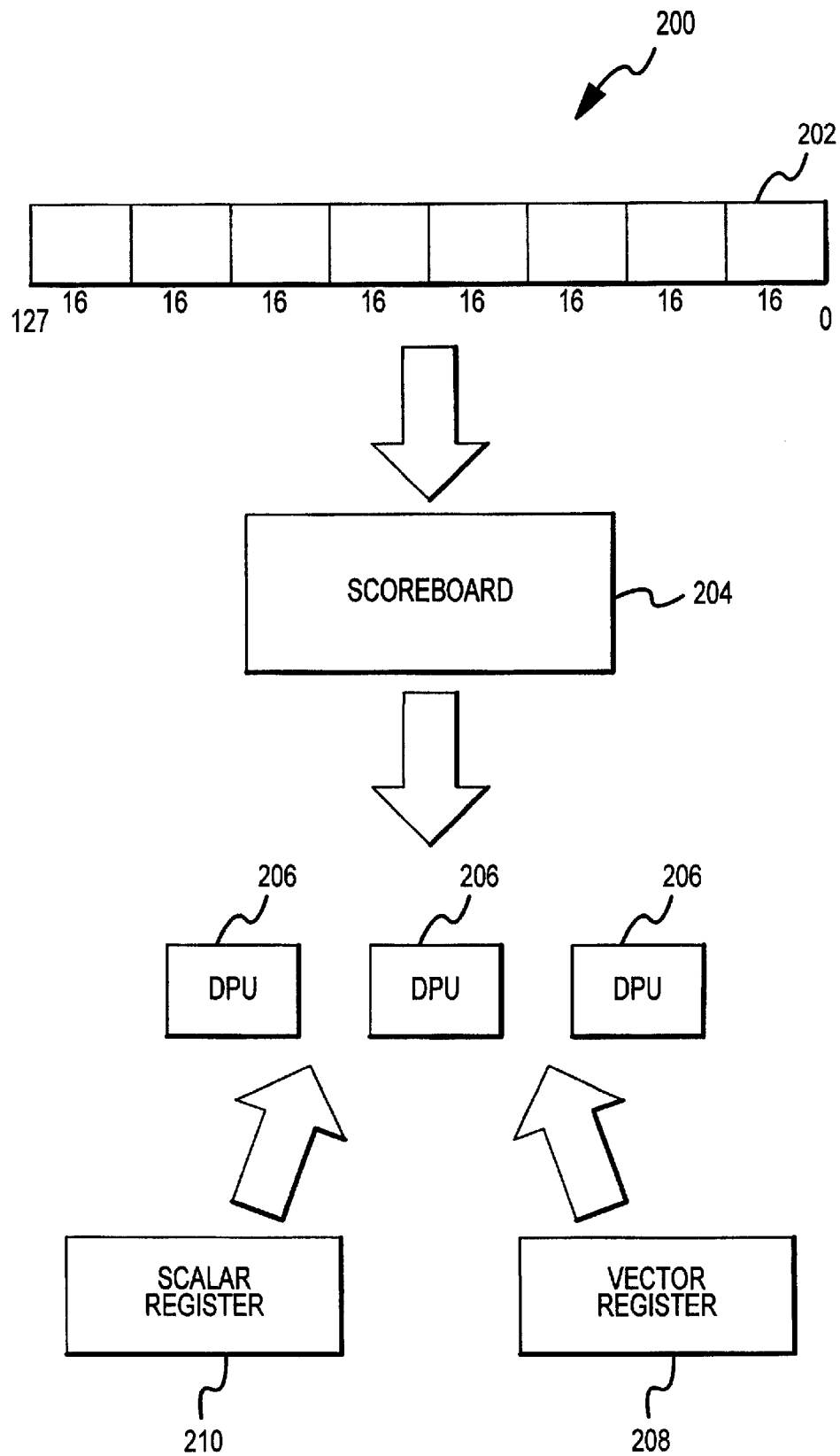
FIG. 2 is a partial schematic representation and partial block diagram of an alternate embodiment of an exemplary hybrid VLIW-SIMD model digital signal processor.

With reference now to FIG. 2, an alternate embodiment of an exemplary hybrid VLIW-SIMD DSP 200 executes a number of 128-bit instruction packets 202. The characteristics of instructions within instruction packet 202 may be varied as described above with reference to FIG. 1. In this alternative embodiment, a DSP of model 200 includes a fewer number of DPUd 206, preferably three, although other numbers could be used, because the instructions in instruction packet 202 are smaller and need fewer functional units in DPUd 206 to execute the instructions. Functional units within DPUs 206 use operands specified in the instructions in instruction packet 202 from scalar register file 210 and/or vector register file 208.

As stated above, the ISA of the hybrid VLIW-SIMD programming model provides for instruction packets having different bit lengths. In accordance with conventional techniques, the instruction packets may have a bit length equal to an integer multiple of eight. Preferably, instruction packets are 256 bits in length as shown in FIG. 1, but this length is exemplary and not so limited. The instructions within the instruction packets may be of various lengths, preferably 32-bit instructions (i.e., long format) and 16-bit instructions (i.e., short format). The dual instruction length set of the present programming model strikes a balance between the improved code density, improved instruction level parallelism, and improved issue bandwidth and efficiency of a fixed-length standard 32-bit reduced instruction set computer ("RISC"). The dual instruction set improves code density in that if an instruction is able to be written using 16-bit instructions, it can be written without wasting the additional memory and time requirements associated with 32-bit instructions. In addition, the dual instruction set improves instruction level parallelism in that now more instructions can be included in an instruction packet. Without the dual instruction set, the maximum number of purely scalar instructions a fixed-length 32-bit instruction set of a 256-bit instruction packet is seven. However, with the inclusion of 16-bit instructions, the maximum number of purely scalar instructions increases to fourteen. The dual instruction set also improves the issue bandwidth, as well as the instruction level parallelism, because the instructions issued per cycle may significantly increase.

In a preferred embodiment, one or more mode bits identify which instruction format is used for each instruction in an instruction packet. As noted above, the hybrid VLIW-SIMD programming model enables the intermixing of 16-bit and 32-bit instructions within one instruction packet, and in the event that the intermixing does occur, the total number of consecutive 16-bit instruction sets in an instruction packet should be even. Preferably, each instruction packet contains a number of mode bits to identify whether each instruction contained in the packet is in the long or short format. A mode field may contain a number of mode bits. For example, a mode field of a 256-bit instruction packet is preferably a 14-bit field containing seven sub-fields, each two bits wide. A first bit value can be set to identify a long format instruction, and a second bit value can be set to identify a short format instruction. Each sub-field corresponds to one long format instruction or two short format instructions. Mode bits may be set and cleared by a move-to-control register instruction. In other words, a given program can use short format instructions, and, after a mode bit is cleared, use long format instructions.

Mode bits are typically located in a multiple-bit template field identifying specifications of an instruction packet which is contained in each instruction packet in accordance with a preferred embodiment of the present invention. In addition to a mode bit sub-field, a template field may also include the following sub-fields: a grouping field (which contains instruction issue groups), a thread identifier, and a repeat field (which identifies whether the entire instruction packet is to be repeated as a zero-overhead loop).

A grouping field may include a fetch packet which typically includes three issue groups, i.e., the number of independent instructions that can be issued concurrently in the same cycle. Instruction packets may be fetched from a storage location during a fetch cycle, i.e., that portion of an instruction cycle during which a fetch occurs, as opposed to the instruction execution portion and the like. During a fetch cycle, a fetch packet, which may be a fixed length VLIW packet, is fetched or retrieved from memory. In an exemplary embodiment of the present invention, a fetch packet is an entire 256-bit VLIW instruction packet having at least seven instruction slots and a control template specifying the issue groups within the packet. A last issue group in a VLIW fetch packet can chain instructions with a subsequent VLIW fetch packet.

Related to the issue group is the issue bandwidth, which represents the number of simple instructions that can be issued, i.e., physically dispatched to execution units, per second. If the issue bandwidth is much smaller than the fetch bandwidth, i.e., the number of VLIW fetch packets that a DSP can fetch per second, the performance of the processor will deteriorate significantly. In other words, a DSP will not be operating efficiently if it is fetching instructions faster than it is executing the instructions and creating a buildup or backlog of instructions. This may be a result of a largely serial or scalar application, which does not take advantage of the parallel resources provided by the processor. This may also be the result of poor instruction scheduling in that the scheduler is not searching broadly enough for independent instructions that can be issued out of order and that can utilize the issue bandwidth of the processor. To achieve more efficient processing, VLIW fetch packets are preferably filled to capacity to take advantage of code density and issue groups are preferably maximized within each fetch packet.

Figure 3:
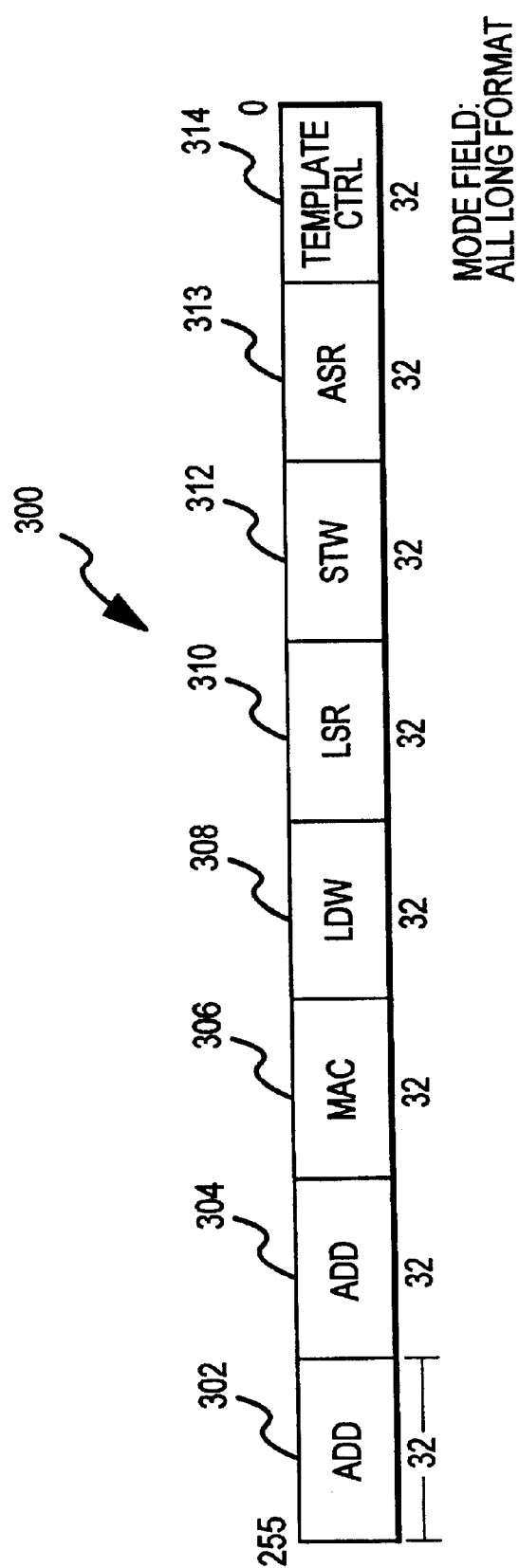
FIG. 3 is a schematic representation of an exemplary instruction packet having all scalar 32-bit instructions.

To illustrate the interaction of the hybrid VLIW-SIMD programming model having differing instructions types and the differing instructions lengths set, several combinations of instructions in an instruction packet can be executed. Referring now to FIG. 3, an exemplary 256-bit instruction packet 300 can include seven 32-bit scalar instructions. This instruction combination would be executed in a pure VLIW mode in the long instruction format. Instruction packet 300 includes two add instructions 302 & 304, one MAC instruction 306, one load word instruction 308, one logical shift right instruction 310, one store word instruction 312 and one arithmetic shift right instruction 313, where all of the instructions are 32 bits wide. In addition, instruction packet 300 may also include a template field 314.

Figure 4:
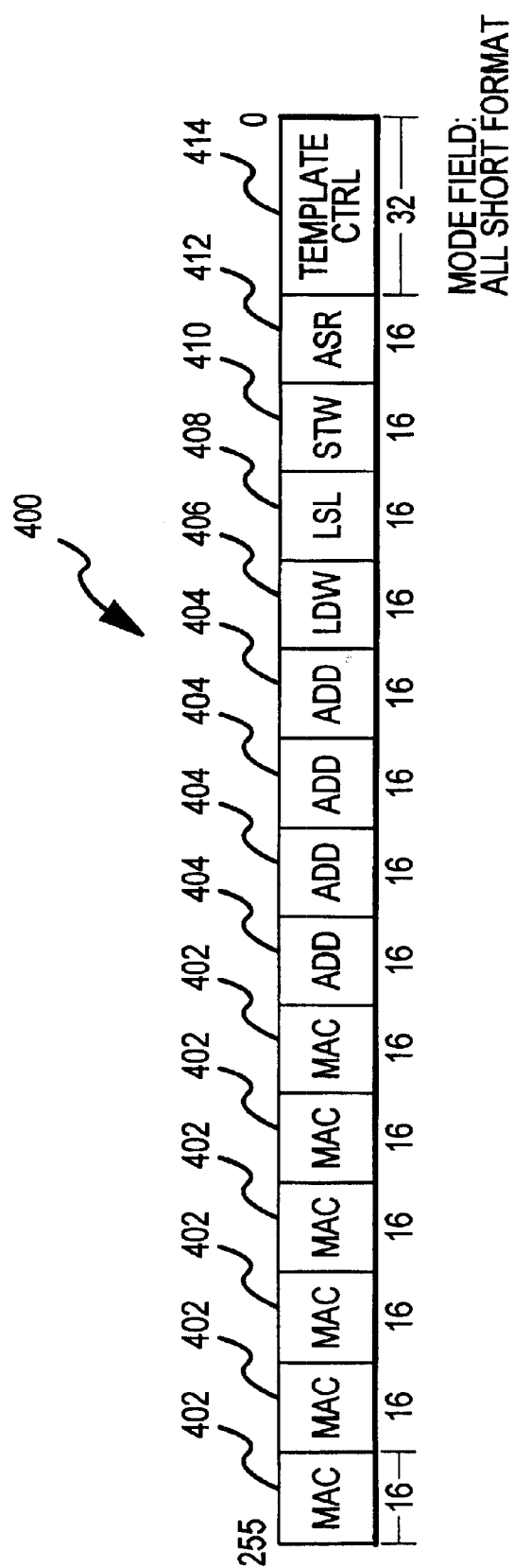
FIG. 4 is a schematic representation of an exemplary instruction packet having all scalar 16-bit instructions.

Referring now to FIG. 4, an exemplary instruction packet 400 could include fourteen 16-bit scalar instructions. This instruction combination would be executed in a pure VLIW mode in the short instruction format. Instruction packet 400 contains six MAC instructions 402, four add instructions 404, one load word instruction 406, one logical shift left instruction 408, one store word instruction 410, and one arithmetic shift right instruction 412, where all of the instructions are 16 bits wide. Instruction packet 400 also contains a 32-bit template field 414, as described above. If, for example, a "0" indicates a short form instruction and a "1" indicates a long instruction format, an exemplary fourteen bit mode filed in the template field would consist of all "0's." However, this convention is exemplary and other identifying conventions may also be used.

Figure 5:
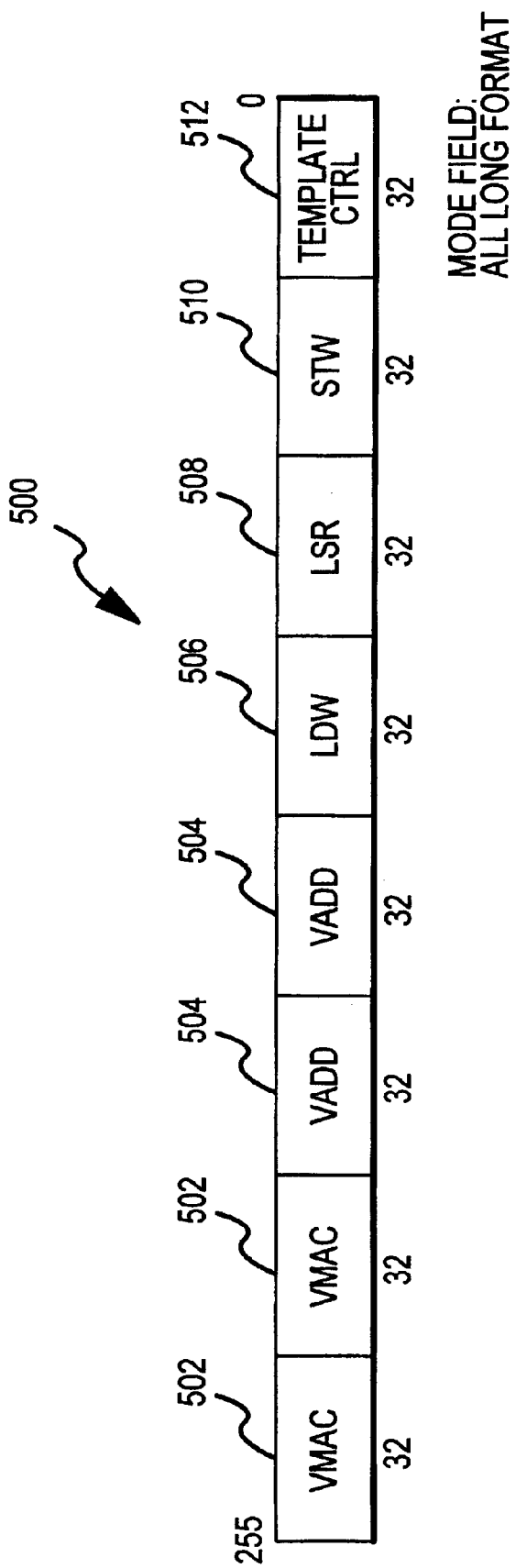
FIG. 5 is a schematic representation of an exemplary instruction packet having scalar and vector 32-bit instructions intermixed.

Referring now to FIG. 5, an exemplary instruction packet 500 may also have scalar and vector 32-bit instructions intermixed. Instruction packet 500 includes three 32-bit scalar instructions and four 32-bit vector instructions. More specifically, instruction packet 500 includes two vector MAC instructions 502, two vector add instructions 504, one scalar load word instruction 506, one scalar logical shift right instruction 508, and one scalar store word instruction 510, where all of the instructions are 32 bits wide. Instruction packet 500 also contains a 32-bit template field 512. Instruction packet 500 is utilizing the hybrid VLIW-SIMD feature, that is, the mixed instruction type feature, of the present invention.

Figure 6:
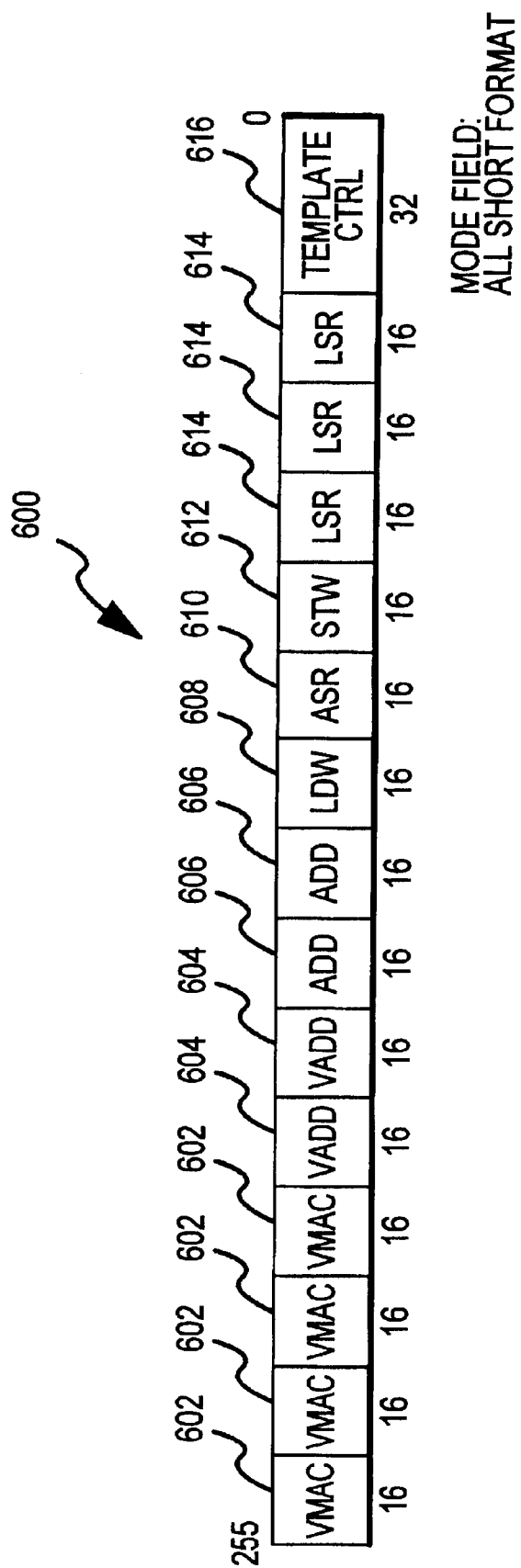
FIG. 6 is a schematic representation of an exemplary instruction packet having scalar and vector 16-bit instructions intermixed.

Referring now to FIG. 6, an exemplary instruction packet 600 may also include scalar and vector 16-bit instructions intermixed. Instruction packet 600 includes eight 16-bit scalar instructions and six 16-bit vector instructions. More specifically, instruction packet 600 includes four vector MAC instructions 602, two vector add instructions 604, two scalar add instructions 606, one scalar load word instruction 608, one scalar arithmetic shift right instruction 610, one scalar store word instruction 612, and three scalar logical shift right instructions 614, where all of the instructions are 16 bits wide. Instruction packet 600 also contains a 32-bit template field 616.

Figure 7:
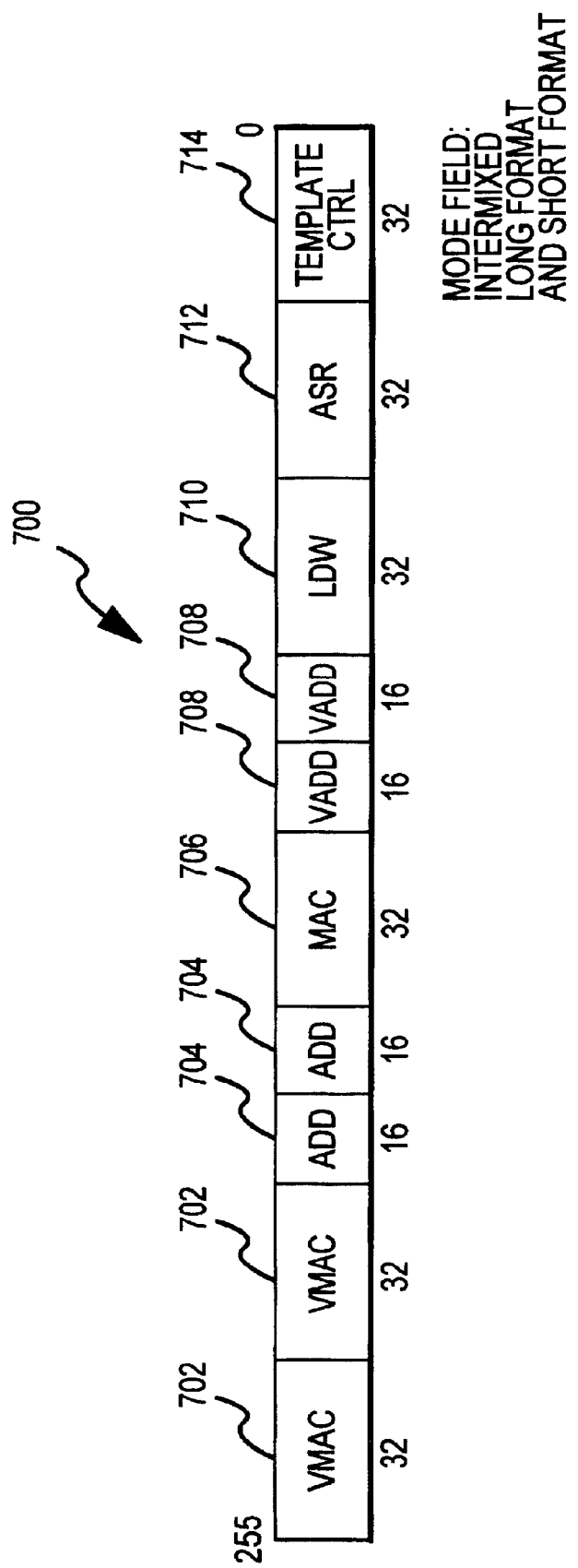
FIG. 7 is a schematic representation of an exemplary instruction packet having scalar and vector 16-bit and 32-bit instructions intermixed.

Referring now to FIG. 7, an exemplary instruction packet 700 mixes both of the characteristics and may include scalar and vector 16-bit and 32-bit instructions intermixed. Instruction packet 700 includes three 32-bit scalar instructions, two 16-bit scalar instructions, two 32-bit vector instruction and two 16-bit vector instructions. Specifically instruction packet 700 includes two 32-bit vector MAC instructions 702, two 16-bit scalar add instructions 704, one scalar 32-bit MAC instruction 706, two 16-bit vector add instructions 708, one 32-bit scalar load word instruction 710, and one 32-bit scalar arithmetic shift right instruction 712. Instruction packet 700 also contains a 32-bit template field 714.

FIGS. 3–7 identify exemplary instruction packets. The configuration of the packets is not so limited and can vary depending upon the requirements of an application.

The configurability of the present hybrid VLIW-SIMD DSP may require intelligence in the hardware to execute the operations in the instruction packets. In general, instruction packets are broadcast to a plurality of processing elements or functional units where each instruction packet contains instructions of various characteristics as discussed above. These characteristics may include, inter alia, varying instruction types and varying instruction lengths. The instruction packet need not identify which specific functional units should be used in executing the various types of instructions. Rather, a scheduler in a DSP is preferably designed to schedule instructions for particular functional units depending on the specific instructions. In a subsequent cycle, the scheduler may reconfigure the coupling or grouping of the functional units and schedule different instructions to them for execution. The reconfiguration ability reduces the amount of execution time needed and reduces the chance of hazards, such as read after write ("RAW") hazards. The functional unit configurability is preferably facilitated by buses feeding source operands to the functional units, buses transferring the results, and the scheduling logic for implementing result forwarding and bypass paths.

Figure 8:
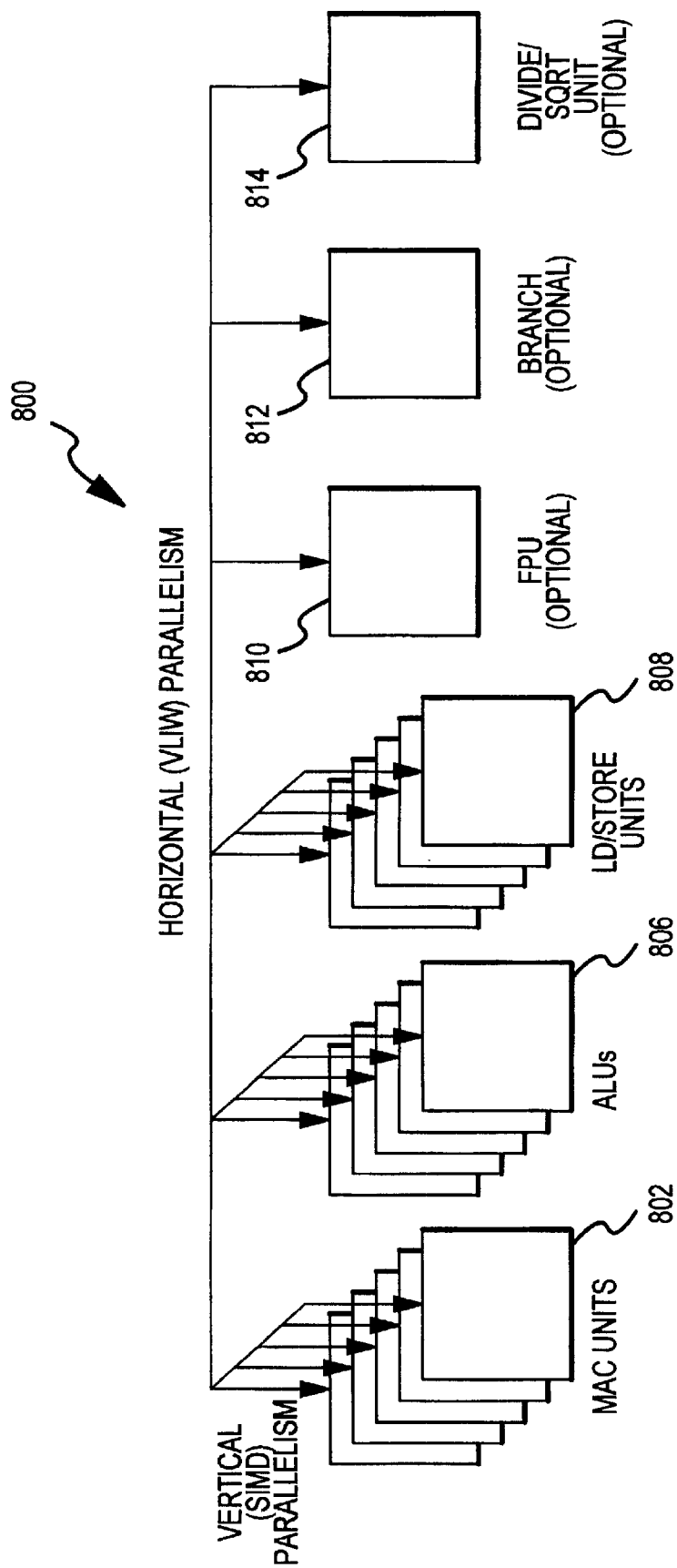
FIG. 8 is a block diagram of an exemplary hybrid VLIW-SIMD digital signal processor.

An exemplary DSP 800 for use with a hybrid VLIW-SJMD programming model in accordance with the present invention is depicted in FIG. 8. DSP 800 preferably includes fifteen functional units for the 32-bit data type. It should be appreciated that such functional units may be capable of performing operations on 16-bit instructions, 32-bit instructions or instructions of other lengths. Functional units include, inter alia, MAC units, adders, subtractors, logical shifts, arithmetic shifts, and any other mathematical or logical operations. DSP 800 preferably includes five MAC units 802 (accumulators not shown separately), five arithmetic logic units ("ALUs") 806 and five load/store units 808. DSP 800 may optionally include one or more floating point units 810, one or more branch units 812 and one or more divide/square root units 814. Other combinations of amounts or types of functional units could also be used. Depending on the functions required in a given program, each functional unit may be accessed to execute instructions regardless of the instruction type or instruction length. These functional units are generally well-known in the art for DSP applications.

Figure 9:
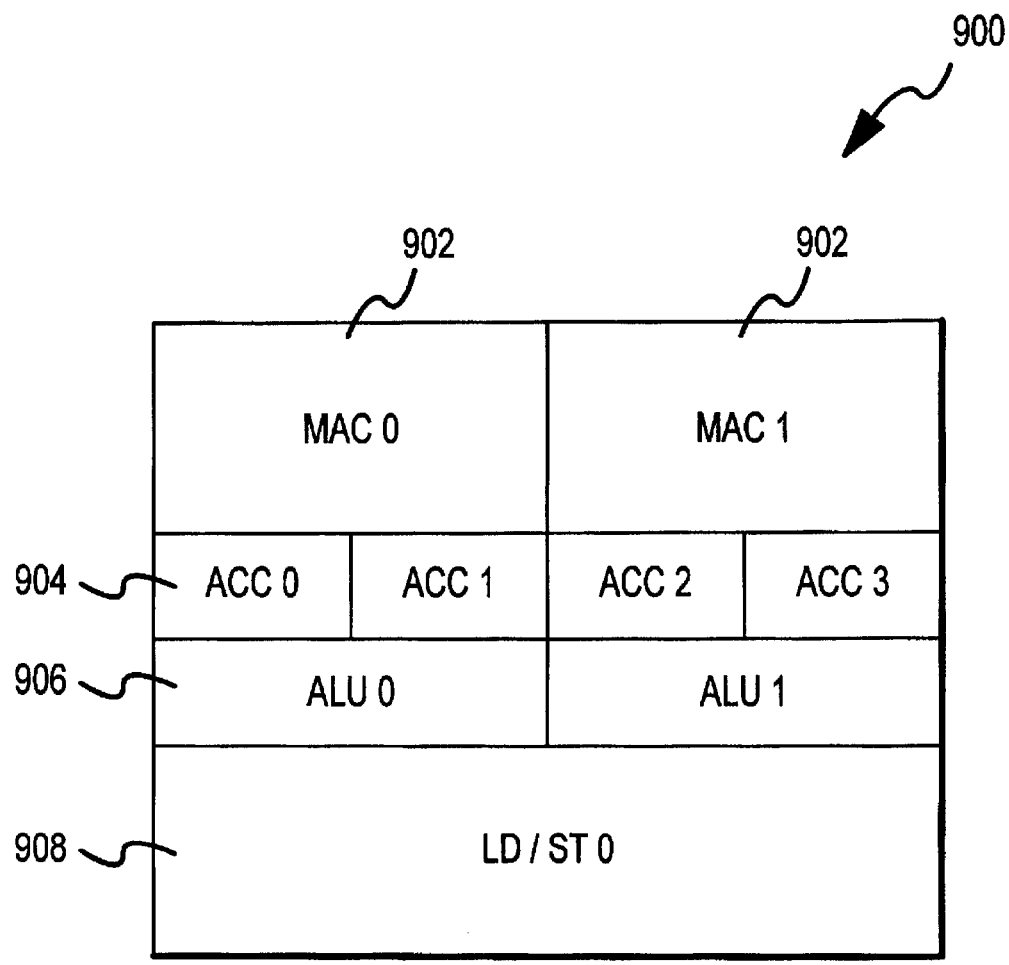
FIG. 9 is a schematic representation of an exemplary data path unit.

Functional units are preferably grouped into symmetric data path units ("DPUs"). Preferably five DPUs are utilized but a different number of units can be constructed based upon the type and amount of functional units needed in a given DSP. FIG. 9 shows a DPU 900, which includes MAC units 902, one or more accumulators 904 (two accumulators shown for each MAC unit), ALUs 906 and load/store unit 908.

Preferably, each MAC unit 902 may be capable of one 32×32 bit multiply-accumulate function, one 32×16 bit multiply-accumulate function, or two 16×16 bit multiply-accumulate functions carried out in parallel in one cycle, although they could be designed with other bit size characteristics. Thus, ten MAC units 902 may be available to perform twenty 16×16 bit operations concurrently in each cycle. Similarly, preferably each ALU 906 may be capable of one 32×32 bit, one 32×16 bit, or two 16×16 bit arithmetic logic functions carried out in parallel in one cycle. Thus, ten ALUs 906 may be available to perform twenty 16×16 bit operations concurrently in each cycle.

Preferably, each load/store unit 908 may be capable of loading or storing either one 32-bit scalar register, a two-element vector where each element is a 32-bit word, or a four-element vector where each element is a 16-bit word. Preferably, each load/store unit may support at least three outstanding loads, i.e., up to four loads in flight in parallel.

Figure 10:
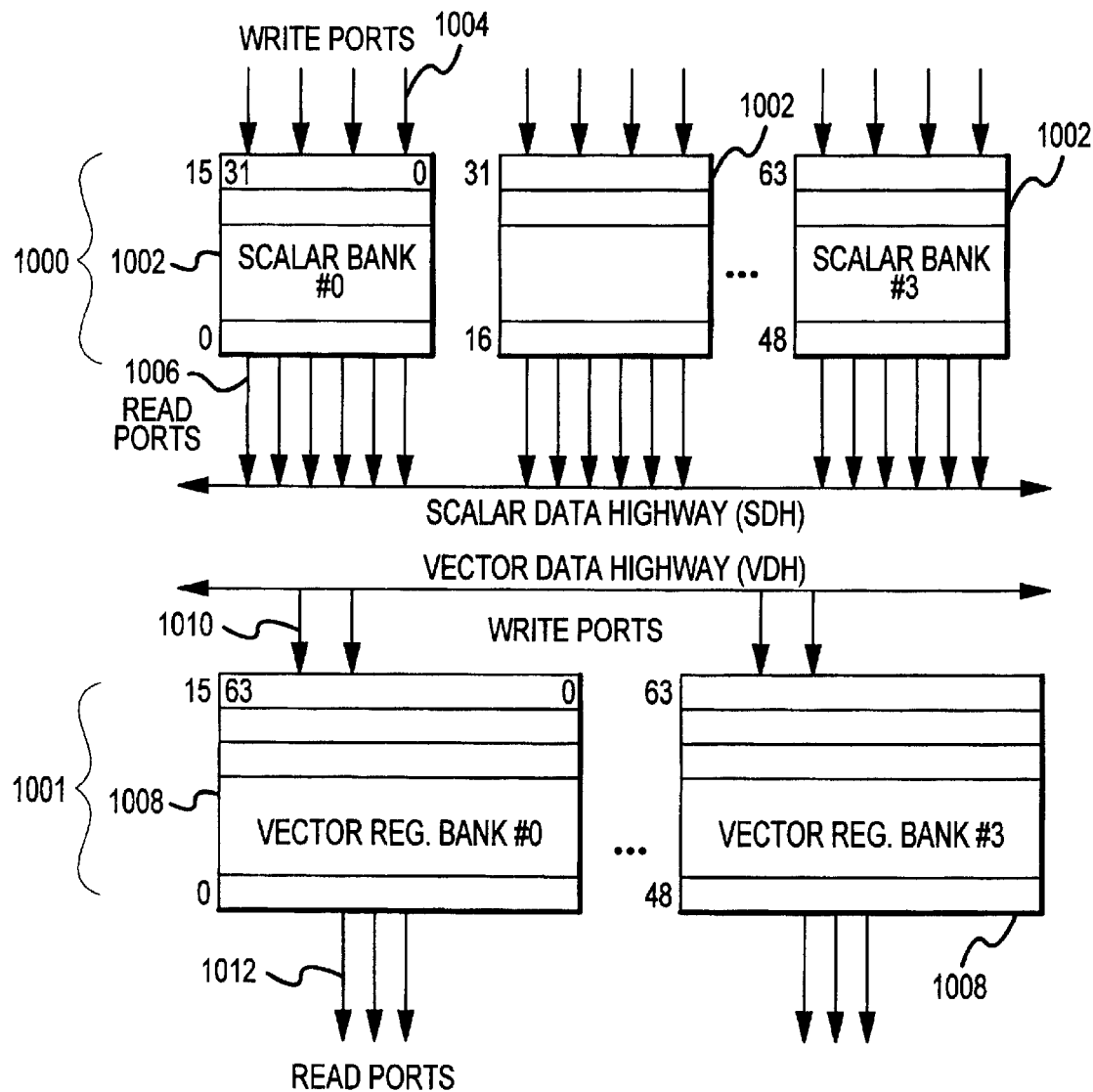
FIG. 10 is a block diagram of exemplary scalar register file banks and exemplary vector register file banks.

With reference now to FIG. 10, exemplary register files in a preferred embodiment of the present invention may be exemplary scalar register file 1000 and exemplary vector register file 1001. Scalar register file 1000 is preferably divided into four scalar register file banks 1002 (three banks shown), each bank having sixteen 32-bit registers. Each bank 1002 preferably includes a number of write ports 1004 and a number of read ports 1006 such that each can provide or receive multiple operands concurrently per cycle. Vector register file 1001 is preferably divided into four vector register file banks 1008, each bank 1008 having sixteen 64-bit registers. Each bank 1008 preferably includes several write ports 1010 and several read ports 1012 to provide or receive a number of vector operands concurrently per cycle. It will be appreciated that the scalar register file and the vector register file are exemplary and that such register files may be divided into a different number of banks. Scalar register file 1000 and vector register file 1001 may store information or data needed to complete operations identified in the instructions as is generally well known in the art. More specifically, scalar register file 1000 and vector register file 1001 hold operand data for use by functional units in DPUs.

Because of the exemplary configuration of the functional units as shown in FIG. 8, DSP 800 may process twenty-five functional units for the 16-bit data type. These functional units include ten MAC units 802, ten ALUs 806, and five load/store units 808. As noted above, DSP 800 may also optionally include additional functional units such as a floating point unit 810, a branch unit 812 and a divide/square root unit 814.

The hybrid programming model embodied in a preferred embodiment of the present invention is a flexible model in that it can configure its functional units as needed. For example, a vector MAC instruction can use two MAC units in a single cycle to do a 64-bit vector MAC. On the other hand, in the VLIW mode, four scalar instructions can be issued in parallel and packed into one instruction packet to perform, for example, one MAC, one shift, one load, and one branch in a single cycle. This flexibility provides superior performance on VLIW model operations such as fast fourier transforms ("FFTs") as well SIMD model operations, such as MPEG, FIRs and image processing algorithms.

The hardware may determine which of the functional units are available to perform the operations specified in the instruction packets via a hardware scheduler, reconfiguring element or scoreboard unit which tracks which functional units are currently performing operations and which units are available to perform operations. The scheduler determines functional unit availability in a way such that the comparators are minimized and the cycle time is not increased. With reference to FIG. 1, an exemplary scheduler 1100 is shown charting destination operands 1102 against source operands 1104. For example, if a particular ALU is currently performing an operation, scheduler 1100 identifies what other ALUs are available to receive data to perform an operation and which ALUs cannot receive the data. Scheduler 1100 is configured based upon how the DPUS and other processing elements are associated and connected.

It will be understood that the foregoing description is of preferred exemplary embodiments of this invention and that this invention is not so limited. Various modifications may be made in the design, arrangement, and implementation of this method and apparatus without departing from the spirit and scope of the subject invention, as set forth in the claims below.

What is claimed is:

1. An instruction set architecture for a digital signal processor comprising:

a first plurality of instruction packets, wherein each of said first plurality of instruction packets comprises a number of first instructions of a same first characteristic; and a second plurality of instruction packets, wherein each of said second plurality of instruction packets comprises a number of second instructions different from said first characteristic, wherein said first characteristic and said second characteristic are different and said digital signal processor comprises a plurality of functional units, each functional unit reconfigurable for one of scalar and vector processing.

2. The instruction set architecture of claim 1, wherein said first characteristic and said second characteristic are different instruction types.

3. The instruction set architecture of claim 2, wherein said first characteristic is scalar instruction type and said second characteristic is a vector instruction type.

4. The instruction set architecture of claim 1, wherein said first characteristic and said second characteristic are different instruction lengths.

5. The instruction set architecture of claim 4, wherein said first characteristic is a 16-bit instruction and said second characteristic is a 32-bit instruction.

6. The instruction set architecture of claim 1, wherein a plurality of functional units of a digital signal processor execute said first instructions and said second instructions, wherein said functional units are reconfigurable in accordance with said first characteristics and said second characteristics.

7. The instruction set architecture of claim 1 further comprising: a third plurality of instruction packets, wherein each of said third plurality of instruction packets comprises a number of third instructions, wherein the characteristic of each of said third instructions is selectable from said first characteristic and said second characteristic.

8. The instruction set architecture of claim 7, wherein the characteristics of at least two of said third instructions in each of said third plurality of instruction packets are different.

9. The instruction set architecture of claim 7, wherein said first characteristic and said second characteristic are different instruction types.

10. The instruction set architecture of claim 9, wherein said first characteristic is a scalar instruction type and said second characteristic is a vector instruction type.

11. The instruction set of claim 7 wherein said first characterstic and said second characteristic are different instruction lengths.

12. The instruction set architecture of claim 11, wherein said first characteristic is a 16-bit instruction and said second characteristic is a 32-bit instruction.

13. The instruction set architecture of claim 7, wherein a plurality of functional units of a digital signal processor execute said first instructions, said second instructions and said third instructions, wherein said functional units are reconfigurable in accordance with said first characteristics and said second characteristic.

14. A digital signal processor for use in executing a first plurality of instruction packets, wherein each of said first plurality of instruction packets comprises a number of first instructions of a same first characteristic and for executing a second plurality of instruction packets, wherein each of said second plurality of instruction packets comprises a number of second instruction of a same second characteristic and wherein said first characteristic and said second characteristic are different and said digital signal processor comprising:

a plurality of functional units, each functional unit reconfigurable for one of scalar and vector processing;

a plurality of functional units; and an element for reconfiguring said functional unit in accordance with said first characteristic and said second characteristic.

15. The processor of claim 14, wherein said reconfiguring element is configured to receive said first instructions and said second instructions, to determine the availability of said functional units and to schedule said first instructions and said second instructions to said functional units for execution.

16. The processor of claim 14 further comprising:

a scalar register file; and a vector register file, wherein said functional units obtain information from one or more register files selectable from said scalar register file and said vector register file in accordance with said first instructions and said second instructions.

17. A digital signal processor for use in executing a first plurality of instruction packets, wherein each of said first plurality of instruction packets comprises a number of first instructions of a same first characteristic, for use in executing a second plurality of instruction packets, wherein each of said second plurality of instruction packets comprises a number of second instructions of a same second characteristic and for use in executing a third plurality of instruction packets, wherein each of said third plurality of instruction packets comprises a number of third instructions, wherein said first characteristic and said second characteristic are different and said digital signal processor comprises a plurality of functional units, each reconfigurable for one of scalar and vector processing and wherein each of said third instructions is selectable from said first characteristic and said second characteristic, said processor comprising:

a plurality of functional units;

an element for reconfiguring said functional units in accordance with said first instructions, said second instructions and said third instructions;

a scalar register file; and a vector register file, wherein said functional units obtain information from one or more register files selectable from said scalar register file and said vector register file in accordance with said first instructions, said second instructions and said third instructions.

18. The digital signal processing system of claim 17, wherein said reconfiguring element receives said first instructions, said second instructions, and said third instructions, to said functional units and wherein said functional units execute said scheduled instruction.

19. A method of executing instructions in a digital signal processing system comprising a plurality of functional units, each reconfigurable for one of scalar and vector processing and further comprising the steps of:

receiving an instruction packet including a number of instructions, wherein a characteristic of each said instructions is selected from a plurality of characteristics;

reconfiguring a plurality of functional units to execute one of scalar and vector processing in response to each said instruction;

receiving information from a register file selectable from a scalar register file and vector register file; and executing said instructions in said reconfigured functional units.

\* \* \* \* \*

UNITED STATES PATENT AND TRADEMARK OFFICE
CERTIFICATE OF CORRECTION

PATENT NO. : 6,366,998 B1
DATED : April 2, 2002
INVENTOR(S) : Moataz A. Mohamed

It is certified that error appears in the above-identified patent and that said Letters Patent is hereby corrected as shown below:

Column 10,
Line 63, "characterstic and said second" should read -- characteristic and said second --.

Signed and Sealed this

Second Day of July, 2002

Attest:

JAMES E. ROGAN
Attesting Officer            Director of the United States Patent and Trademark Office